(No Model.) 2 Sheets—Sheet 1.
N. P. BOWSHER.
GRINDING MILL.
No. 370,310. Patented Sept. 20, 1887.
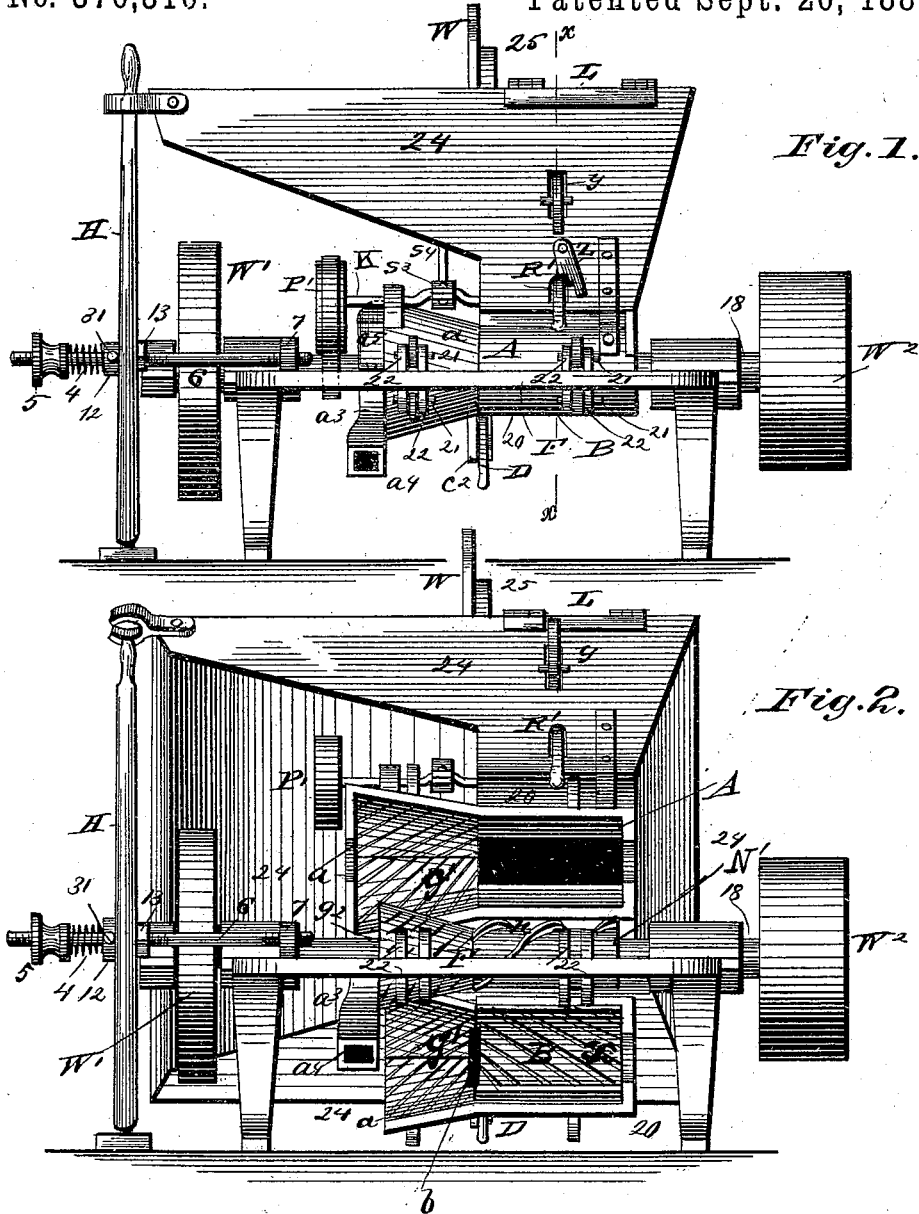
WITNESSES
Phil. C. Dieterich.
F. F. F. Johnson.
INVENTOR
Nelson P. Bowsher.
by J. M. Alexander
Attorney

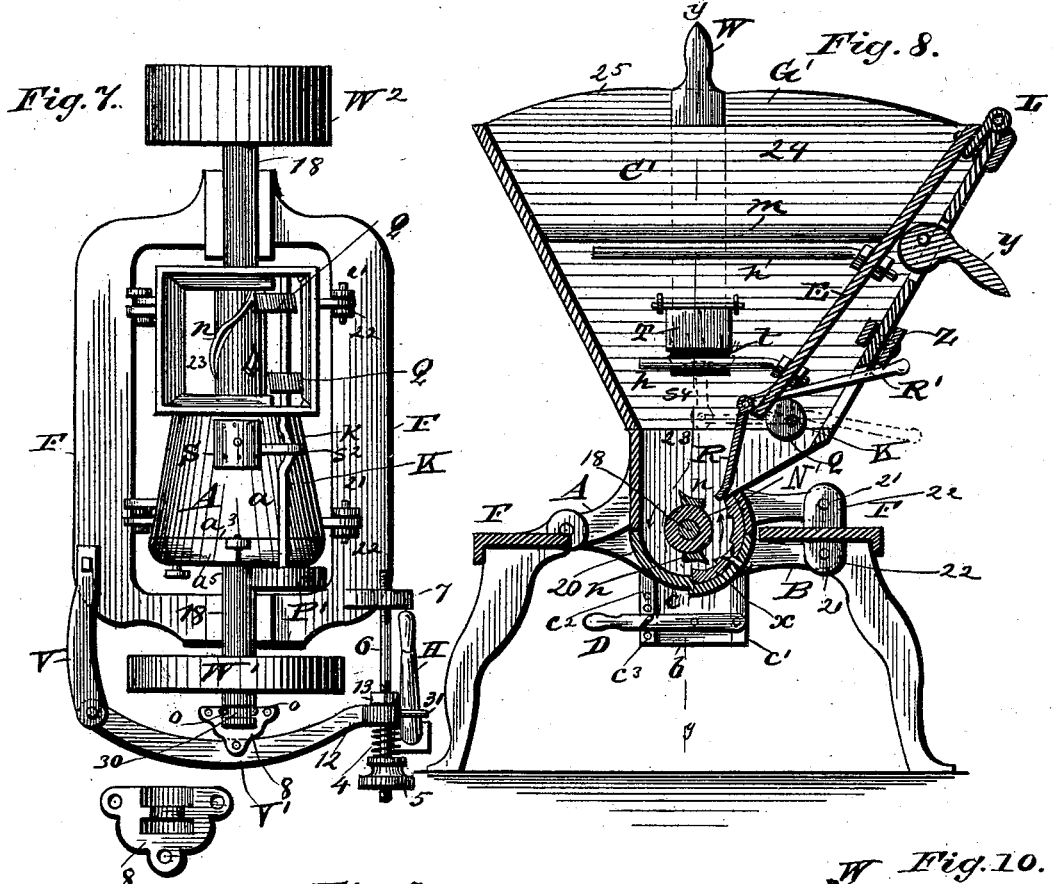

UNITED STATES PATENT OFFICE.

NELSON P. BOWSHER, OF SOUTH BEND, INDIANA.

GRINDING-MILL.

SPECIFICATION forming part of Letters Patent No. 370,310, dated September 20, 1887.

Application filed December 30, 1886. Serial No. 223,017. (No model.)

*To all whom it may concern:*

Be it known that I, NELSON P. BOWSHER, of South Bend, in the county of St. Joseph and State of Indiana, have invented certain new and useful Improvements in Grinding-Mills; and I do hereby declare that the following is a full, clear, and exact description thereof, reference being had to the accompanying drawings, and to the letters of reference marked thereon, which form part of this specification, in which—

Figure 1 represents a side elevation of the grinding-mill complete. Fig. 2 is a similar view showing the hopper and sections of the grinding-shell thrown back. Fig. 3 is a detail view of the grinding-shell sections. Fig. 4 shows a detail view of a portion of the casing, showing the cap and discharge-spout. Fig. 5 is a detail view showing the cams and their attachments. Fig. 6 is a detail vertical section showing the cut-off. Fig. 7 is a plan view of the mill, a portion of the hopper being removed. Fig. 8 is a vertical transverse section of the mill on line $x\,x$, Fig. 1. Fig. 9 is a detail view of the inclined plate S and its attachments. Fig. 10 is a vertical longitudinal section of the grinding-mill on line $y\,y$, Fig. 8.

This invention relates to improvements in feed-grinding mills, the main object being to crush the whole ears of corn primarily and grind the same afterward simultaneously and together with the small grain—such as oats—to be mixed therewith, thus avoiding the separate grinding of the said materials and their mixture by means of the shovel, which is both slovenly and wasteful of the same.

Further objects of the invention are to so construct the machine that the grinding-cones and crushing-rolls will be readily accessible when the same is necessary; the passages for the ground material can be readily cleared when clogged; the grinding devices will be adjustable to each other, and the feed will be automatically regulated in accordance with the amount of crushed ears passing through the mill.

The invention consists in the construction and novel arrangement of parts, hereinafter described, and illustrated in the drawings and pointed out in the appended claims.

Referring to the accompanying drawings, F designates a horizontal frame of general rectangular shape, supported on legs, as shown, and preferably made of cast-iron. This frame is provided at its ends with bearings for the main shaft 18, upon which the crushing-roll and grinding-cone are mounted.

$n\,n$ are the spiral crushing knives or cams secured to or formed on the crushing-roll $n'$, and $g^2$ are the corrugated grinding-plates, bolted or otherwise connected upon the horizontal frustum of a cone, O, secured upon shaft 18.

A and B are respectively the upper and lower portions of the casing surrounding the crushing and grinding mechanism, the part 20 thereof, which surrounds the roll N', being cylindrical, and the part $a$ conical to conform in shape to the cone O. The said upper and lower parts of the casing are each hinged to the main frame, and the former is attached to the lower surface of the hopper, hereinafter described, so that it can be turned up and the lower part turned down to give access to the grinding and crushing mechanism. When the two parts of the casing are closed upon each other, they are so retained by the pins 21, which pass through the perforations in lugs 22 on their edges and on the main frame.

$g'$ and $x$ are respectively sections of concave crushing and grinding surfaces or plates, both suitably corrugated, the former made on the section of a cone and secured to the internal surface of the conical portion $a$ of the casing, and the latter made on the section of a cylinder and secured to the internal surface of the cylindrical portion 20 of the casing. The conical portion $a$ of the casing has a cap, $a^3$, at its larger end, which is provided at the under part of its periphery with a discharge chute or spout, $a^4$, and an opening near the upper portion of its circumference, covered by a pivoted or hinged door, $a^5$, as seen in Fig. 4. By means of this opening the discharge-spout can be cleared when clogged. The cylindrical part 20 of the casing communicates at top, by the opening 23, with the hopper, hereinafter described.

In the under surface of the portion B of the casing is a transverse slot, $b$, having depending flanges on each side, and in the said slot fits snugly and moves vertically a cut-off plate, $c$, the upper edge of which is made concave, and the side edges of which slide in ways made in guides $c'$ $c^2$, depending from the part B of the casing.

D is a lever-handle having its heel pivoted to the lower part of the guide $c'$, its central portion pivoted in a slot near the lower end of the plate $c$, and its free end provided with a suitable pin, and by means of the adjusting-openings $c^3$ the lever, and consequently the plate $c$, can be set at different heights, so as to regulate the feed from the crushing part of the casing to the grinding part of the same, the concave edge of the plate $c$ being adapted to move up near to the main shaft 18, as seen in Fig. 10.

The hopper 24 is secured to and opens into the cylindrical part of the casing, as described, and is divided into two compartments, G' and C', respectively, by a vertical partition or diaphragm, 25. The compartment C' is for ears of corn, and the opening 23 is at the bottom thereof. The compartment G' of the hopper is for oats or other grain, and stands out from one end of the compartment C', communicating therewith through an opening, $t$, at the lowest point of the partition 25, which opening is covered by a hinged flap or door, T, adapted to permit the grain to pass into the compartment C', but to prevent the ears of corn from passing in the opposite direction.

K is a shaft journaled upon the casing and the lower part of the hopper, and having secured upon it a pulley, P', which is rotated by a belt which passes around and is operated by the main shaft 18. The shaft K has upon it the crank $k$ and the eccentrics Q Q. The said crank passes through a slot, $s^3$, in the horizontal arm $s^2$ of a bell-crank lever pivoted at its angle upon a perforated lug on the upper part of the casing. The vertical arm $s^4$ of said lever has upon its end the inclined plate S, which stands over an opening in the downwardly-inclined floor of the compartment G' of the hopper and vibrates over said opening as the shaft K is rotated. The said plate is preferably made convex on its upper surface, and has an upstanding finger, S', thereon, and also ribs $r$ $r$, which feed the small grain (such as oats) equally through the opening $t$ into the compartment C', and prevent the grain bridging in said opening.

E is a vibrating feeding-board, hinged at its upper edge at L to the upper edge of the compartment C' of the hopper. The said board is provided with one or more horizontal directing fingers or bars, $h$ $h$. As shown in the drawings, they are arranged with the upper two near the sides of the compartment and a third bar centrally below the same. Two or more of said fingers may be used.

$m$ $m$ are guides secured to the sides of the compartment parallel and adjacent to the upper two bars and having their upper sides beveled or inclined downward, so as to direct the ears of corn upon the said upper bars, from which they fall inward upon the lower bars, $h$, and are then moved outward over the same on each side, so as not to clog the passage to the crushing mechanism. The board E is vibrated inward and outward by the cam-disks Q Q on the shaft K as the latter rotates, and thereby prevents the ears of corn from wedging in the hopper, while the bars $h$ and the guides $m$ direct the descent of the same and prevent them from falling fast enough to clog the discharge-opening.

R is a feeding-apron hinged or pivoted to the lower edge of the board E, and balanced in position by an arm, R', extending through a suitable slot in the side of the hopper.

When the crushed ears collect in a larger quantity in the crushing-casing 20 than the mechanism will feed regularly to the cone in the grinding-casing $a$, the said crushed ears are carried around with the shaft, following the course of the arrows in Fig. 8, impinge against the lower edge of balanced apron R, and force the same to turn upward and inward, and thereby cut off, partially, the feed of the ears to the crushing-casing, so that the feed is thus automatically regulated.

Z is a detent-arm or latch-lever pivoted upon the outside of the hopper, and capable of having its notched end free and turned down on the arm R', so as to hold the apron R closed and cut off the feed.

$y$ is a lever having an eccentric head, pivoted inside the hopper, with its arm passing through a suitable slot in the side of the same. By means of this lever the board E can be moved inward to a slight degree, so as to stop or lessen the extent of its vibration, and consequently the feed of the ears downward.

W is a vertically-sliding slat moving in ways made on the partition, and having its upper end made into a handle. By sliding or moving this slat downward the opening $t$ can be closed, so as to cut off the communication between the compartments G' and C' of the hopper.

The mechanism for regulating the fineness or coarseness of the grinding is as follows: The shaft 18 is movable longitudinally in its bearings on the main frame.

$W^2$ is the driving-pulley on the shaft 18, on the end of the same adjacent to the compartment C' of the hopper, and W' is a small but heavy fly-wheel on the opposite end of the said shaft, to regulate its rotation. The driving-pulley has its perimeter made wide, so as to allow for the movement of the shaft in its bearings without displacing the belt. The end of shaft 18 outside of wheel W' is grooved circumferentially, and fits in a recess in a bearing-block, 8, a pin or pins on the inner surface of the recess entering the said groove 30, so as make the shaft move with the bearing-block without stopping the rotation of the former.

V' is a transverse lever pivoted at one end to the outer end of a link-bar, V, the inner end of which is pivoted upon the main frame F. The other end, 12, of the said lever is enlarged and perforated, so as to allow the horizontal rod 6 to pass therethrough. The said rod has both its outer and inner ends threaded, the inner end engaging in a threaded opening in a stud or lug, 7, standing out from the main frame.

13 is a collar secured on the rod 6, with the enlarged end of the lever V bearing against it, and 5 is a thumb-nut engaging the outer threaded end of the rod 6. Between the said nut and the end 12 of the lever V' is the coiled spring 4, which surrounds the rod 6. By moving the said rod inward, so as to pass farther through the lug 7, the cone grinders will be brought nearer to the engaging concave grinding-surfaces on the interior of the casing a, so that the mill will grind finer. By moving the rod outward the grinding-surfaces will be moved farther apart and the mill will grind coarser.

When any hard material—such as a stone or nail—is passing between the grinding-surfaces, the spring 4 will permit the shaft 18 to move outward, so as to give clearance between said surfaces and prevent any injury being done to the same or the process of grinding from being interrupted. The shifting of shaft 18, while it regulates the quality or degree of fineness of the grinding mechanism, will not affect the crushing action of roll N', although the latter is shifted with the shaft, as is evident.

H is a vertical lever, having its lower end pivoted upon a suitable step or block on the the floor of the room in proper position to bear upon a pin, 31, standing outward from the enlarged end 12 of the lever V'. By means of the said lever and pin the grinding-surfaces can be thrown out of engagement when no material is passing, so that no unnecessary wear will take place. It is obvious from the foregoing that the machine may be made to grind ears of corn only or ears and small grain simultaneously mixed and together, and is adapted to feed the ears automatically, so as to prevent choking between the crushing and grinding cases, while all parts are under the control of the operator, who can grind the material finer or coarser at will, can cause the feed of the two kinds of material to be proportioned as is most desirable, and can prevent the grinding-surfaces from wearing when no material is passing through the mill.

Having described my invention, I claim—

1. In a feed-grinding mill, the combination, with the transverse shaft 18, journaled upon the main frame, the crushing-roll N', provided with spiral crushing-knives n, mounted on the shaft 18, and the grinding-cone mounted on said shaft and having its apex adjoining roll N', of the casing inclosing said roll and cone, correspondingly shaped thereto, and composed of an upper half or section, A, having a feed-hopper secured thereon, and a lower section, B, each section being hinged to the main frame by proper lugs at the same side of the mill, and suitable devices for locking the sections of the casings together during the operation of the mill, all substantially as and for the purpose described.

2. In a feed-grinding mill, the combination, with the grinding mechanism, of a double hopper, a hinged inclined shaking-board, in one compartment thereof provided with outstanding fingers adapted to feed ears of corn to the grinding mechanism, and the other compartment adapted to receive small grain, and having its bottom higher than that of the first compartment and communicating therewith through an opening at its bottom, a flap or valve, T, closing said opening, and suitable mechanism in the same to agitate the grain therein, all constructed and arranged substantially as described.

3. In a feed-grinding mill, the combination of the hopper 24, divided into large and small compartments C' and G,' respectively, adapted to receive ears of corn and small grain, and the latter communicating with the former through feed-opening t, a flap or valve, T, over said opening, an interior cut-off plate, W, with a vibrating plate, S, having standing fingers S' r, adapted to direct the grain through opening t, and suitable means for vibrating this plate, all substantially as described.

4. The combination, with a feed-hopper having inwardly-standing horizontal directing-ribs m on its sides, of a vibrating plate, E, hinged at its upper ends to the end of the hopper, and having a series of horizontal fingers, h, arranged parallel with but below the ribs m, the shaft K and cams Q Q for vibrating this plate, and the cam-arm y for regulating the position of said plate, substantially as described.

5. In a feed-grinding mill, the combination of the shaker E, the apron R, the arm R', balancing the same, the shaft K, having eccentrics Q Q, the main shaft 18, the grinders and crushers thereon, and the casings for the same, substantially as described.

6. In a feed-grinding mill, the combination of the hopper having the compartments G' and C', the main shaft, the shaker-shaft K, provided with eccentrics Q Q and crank k, as described, the shaker-board E in the compartment C', and the shaker S, having the fingers S', moving in an opening in the floor of the compartment G', and a bell-crank lever actuated by the crank of the shaker-shaft, all substantially as specified.

In testimony that I claim the foregoing as my own I affix my signature in presence of two witnesses.

NELSON P. BOWSHER.

Witnesses:
JAMES DU SHANE,
CHAS. W. WILEY.